Jan. 7, 1930.  A. WATTERS  1,742,740
TIRE PRESSURE GAUGE
Filed Jan. 9, 1920
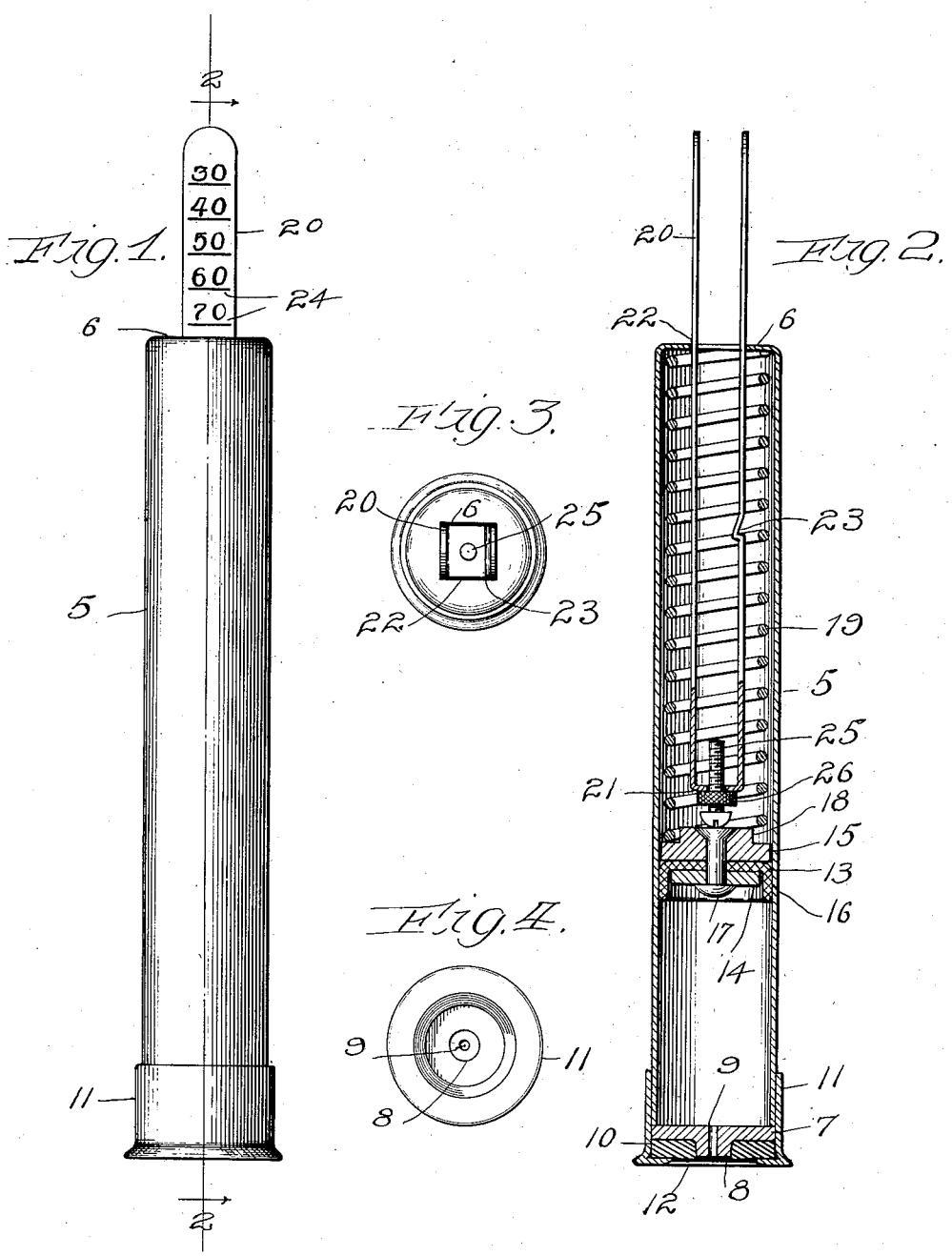
Inventor,
Alex Watters,
By Glenn S. Noble Atty.
Witness:
H. L. Farrington Patented Jan. 7, 1930

1,742,740

UNITED STATES PATENT OFFICE

ALEX WATTERS, OF CHICAGO, ILLINOIS

TIRE-PRESSURE GAUGE

Application filed January 9, 1920. Serial No. 350,394.

This invention relates to testers or tire gauges such as used for testing the compression of the air in pneumatic tires.

The principal object of this invention is to provide a tester or gauge of particularly simple construction and one which will be exceedingly accurate in operation. Other objects are to provide a device of this character in which the principal elements may be drawn or stamped; to provide a tester having few parts; to provide a tester having an indicating gauge which will remain in adjusted position when the indication is made; to provide means for adjustment of the gauge, and to provide a gauge or tester having such novel features and such advantages as will be more fully apparent from the following description taken in connection with the accompanying drawings. In these drawings:

Fig. 1 is a side view;
Fig. 2 is a longitudinal sectional view;
Fig. 3 is a top view; and,
Fig. 4 is a bottom view.

The tester comprises a tubular body portion 5 which may be made of any suitable material and in any convenient manner but which is preferably drawn from sheet metal and is formed with one end or head 6 which has a hole therethrough for the indicating member. A plate or washer 7 fits over the open end of the cylinder 5 and has a projection 8 for engagement with the valve stem for opening the tire valve. This head or end 7 is provided with a hole 9 to admit air to the cylinder. A soft rubber washer 10 fits over the projection 8 and rests against the washer 7. These washers are held in position by a cap 11 which fits over the end of the cylinder 5 and which has a central opening 12 for receiving the end of the tire valve. The cap 11 may be held by being forced onto the cylinder or may be otherwise secured thereto. The cylinder 5 is provided with a piston 13 which may be made in any suitable manner but preferably comprises a lower disk 14 and an upper disk 15 with a resilient washer 16 held between them. These parts are secured together by means of a rivet 17. The upper disk 15 is preferably shouldered as indicated at 18 for engagement with one end of a compression spring 19 which extends from the piston to the head or end 6. The indicating member is formed of a strip of metal or resilient material bent in a substantially U-shape thereby forming two arms 20 and a cross-piece 21. This indicator extends in through the hole 22 in the end 6 and is adapted to be actuated by the piston. The arms 20 have sufficient frictional engagement with the sides of the hole so that the indicator will be held in adjusted position. In order to prevent the indicator from being accidentally displaced or removed from the cylinder, one of the arms 20 is provided with a notch 23 which will engage with the end 6 and prevent the outward movement of the indicator. However, the indicator may be removed by pressing the arms 20 together a sufficient amount to release the catch. One or both of the arms 20 is provided with an indicating scale 24 for indicating the pressure on the piston.

It is difficult to produce a plurality of springs all having the same compression and after a spring has been used for some time, it is liable to become somewhat weakened. For this reason, I provide means for adjusting the indicator with relation to the piston and spring so that it may be adjusted to give an accurate reading on the scale. In the present instance, this adjustment is provided by having a screw 25 which engages with the threaded cross-piece 21 and is provided with a lock nut 26. The head of the screw engages with the piston, preferably with the rivet 17. The reading of the scale is taken at the line where it projects from the end of the cylinder and it will be readily seen that the screw may be regulated to bring the scale to register to show the proper reading when the device is tested in comparison with a standard pressure gauge.

It will be noted that the device is shown in Figs. 1 and 2 with the piston in raised position which it would assume when air under pressure is admitted to the cylinder.

When the air in a tire or other receptacle is to be tested, the gauge is pressed down over the tire valve and the resilient washer 10 serves to make a tight connection. The projection 8 presses against the valve stem so as to admit air into the cylinder 5. The air pressing against the piston 13 tends to raise the same against the pressure of the spring 19. As the piston moves outwardly, the pressure may be determined by the gauge or scale 24 which is properly calibrated to correspond with the spring. When the tester or gauge is removed, the piston will return to normal position but the indicator will remain in raised or extended position to indicate the pressure. For this reason, the device may be readily applied to a valve, even if the valve is in a dark place, and may then be taken to the light to read the pressure. The indicator is then pressed down against the piston for taking the next reading.

Having thus described my invention, what I claim and desire to secure by Letters Patent is:

1. In a tire pressure gauge, the combination of a cylinder having an air inlet at one end, a piston in said cylinder, a spring tending to move the piston in one direction, a pressure indicating member engaging with said piston and projecting through the end of the cylinder, means for holding the indicating member in adjusted position, and an adjustable member secured to the indicating member and adapted to engage with the piston for adjusting the indicating member with respect to the piston.

2. In an air pressure gauge, the combination of a cylinder, a piston in said cylinder, means for admitting air to one end of the cylinder, a substantially U-shaped indicator extending out through a hole in the opposite end of the cylinder, and an adjusting screw in said indicator for engagement with the piston.

3. In an air pressure gauge, the combination of a cylinder having a piston therein, an indicator comprising a strip of metal bent to form two arms with a cross-piece at one end, said indicator extending out through an opening in the end of the cylinder, a stop on one of said arms adapted to engage with the end of the cylinder, and an adjusting screw in said cross-piece for engagement with the piston.

4. A pressure gauge comprising a cylinder having a piston slidable therein and a detached indicating member co-operating with said piston and a screw for adjusting the indicating member relative to the piston.

ALEX WATTERS.